US008819558B2

(12) United States Patent
Hirakawa

(10) Patent No.: US 8,819,558 B2
(45) Date of Patent: Aug. 26, 2014

(54) EDITED INFORMATION PROVISION DEVICE, EDITED INFORMATION PROVISION METHOD, PROGRAM, AND RECORDING MEDIUM

(75) Inventor: Yasufumi Hirakawa, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 12/998,960

(22) PCT Filed: Dec. 25, 2009

(86) PCT No.: PCT/JP2009/007241

§ 371 (c)(1),
(2), (4) Date: Jun. 20, 2011

(87) PCT Pub. No.: WO2010/073695

PCT Pub. Date: Jul. 1, 2010

(65) Prior Publication Data

US 2011/0258546 A1    Oct. 20, 2011

(30) Foreign Application Priority Data

Dec. 25, 2008    (JP) .................................. 2008-329699

(51) Int. Cl.
  *G06F 3/048*  (2013.01)
  *H04N 5/93*  (2006.01)

(52) U.S. Cl.
  USPC ........................... 715/723; 715/716; 386/280

(58) Field of Classification Search
  USPC ....................................................... 715/723
  See application file for complete search history.

(56) References Cited

U.S. PATENT DOCUMENTS 6,670,966 B1 *  12/2003  Kusanagi ...................... 715/723
7,020,381 B1 *   3/2006  Kato et al. .................... 386/280
7,305,381 B1 *  12/2007  Poppink et al. ..................... 1/1
7,359,617 B2     4/2008  Ma
8,150,217 B2 *   4/2012  Nakamura et al. ............ 382/309
2003/0215214 A1 11/2003  Ma
2005/0063668 A1  3/2005  Hosoi et al.
2008/0253683 A1 10/2008  Nakamura et al.

FOREIGN PATENT DOCUMENTS

| JP | 2001-203979 A | 7/2001 |
| JP | 2004-040767 A | 2/2004 |
| JP | 2005-094391 A | 4/2005 |
| JP | 2007-336106 A | 12/2007 |

OTHER PUBLICATIONS

Adobe Premiere Pro 2.0 Studio Techniques: Studio Techniques, ISBN-13: 978-0321385475.
Chinese Notification of First Office Action dated Mar. 15, 2013 with English translation thereof.

* cited by examiner

*Primary Examiner* — Alvin Tan
*Assistant Examiner* — Xuyang Xia
(74) *Attorney, Agent, or Firm* — McGinn IP Law Group, PLLC

(57) ABSTRACT

An edited section information acquisition unit generates edited section information and edited section association information based on edit history information. Pre-edit content/post-edit content correspondence relationship acquisition unit groups consecutive edited groups based on the edited section information of the edited section information acquisition unit and generates group information. An edited section information display screen generation unit generates screen information based on the edited section information and the edited section association information of the edited section information acquisition unit, the group information, intergroup association information, section/group association information of the pre-edit content/post-edit content correspondence relationship acquisition unit, and input information of an input unit. A provision unit displays the screen information obtained by the edited section information display screen generation unit.

18 Claims, 19 Drawing Sheets

EDITED INFORMATION PROVISION DEVICE, EDITED INFORMATION PROVISION METHOD, PROGRAM, AND RECORDING MEDIUM

TECHNICAL FIELD

The present invention relates to an edit information provision device, an edit information provision method, an edit information provision program, and a recording medium, and more particularly, to an edit information provision device that can collectively provide a correspondence relationship between pre-edit content and post-edit content.

BACKGROUND ART

In recent years, dealing with content has become familiar. Concomitantly with this, software that allows editing on an information terminal device has been continuously developed, and research on a manner of enabling a user to effectively edit has been conducted.

As existing software that allows checking for editing history information of content, there is video editing software "Adobe Premier Pro CS3" (for example, Non-Patent Document). The software is software for editing video content and has a function of managing edit history information called "history", which retains an editing behavior conducted by a user at the time of video editing in a time order.

Patent Document 1 describes a video editing support device. In the video editing support device, arrangement options of shots in editing a video are provided for a common user who does not have a technique or knowledge of video editing. The video editing support device learns time-series configuration information, synchronization information, and the same scene of a video and a sound of a pre-edit video and a post-edit video, compares a feature of a video material to be edited with a learning result, and provides arrangement options of shots. In the video editing support device as claimed in claim 6 of Patent Document 1, learning is performed using a post-edit video on which an editing process has been performed and a pre-edit video that is a video on which an editing process has not been performed.

FIG. 19 is a diagram illustrating only a learning unit of the video editing support device of Patent Document 1.

As illustrated in FIG. 19, a learning unit 1000 includes a video reception unit 1001, a video signal extraction unit 1002, and a video analysis unit 1003.

A pre-edit video and A post-edit video used for learning are input to the video reception unit 1001.

Next, the video signal extraction unit 1002 extracts features of a video and a sound in the pre-edit video and the post-edit video obtained by the video reception unit 1001.

Next, the video analysis unit 1003 judges which shot of the pre-edit video is used at which position of the post-edit video by comparing the features of the video and sound in the pre-edit video with those of the post-edit video.

Then, a rule of selecting shots used for editing from the pre-edit video and arranging the shots is learned.

Patent Document 2 discloses a video editing method of representing relevance between a material called a parent clip and a child segment generated from the material by an arrow (or any other corresponding expression, for example, color), that is, representing a derivational relationship between the parent clip and the child segment.

Patent Document 1: Japanese Patent Application Laid-Open (JP-A) No. 2007-336106
Patent Document 2: Japanese Patent Application Laid-Open (JP-A) No. 2004-040767
Non-Patent Document 1: Adobe Premiere Pro 2.0 Studio Techniques: Studio Techniques, ISBN-13: 978-0321385475

DISCLOSURE OF THE INVENTION

However, in the above-described software and the video editing support device, there have been the following problems.

That is, when a user repeatedly edits the content, it is difficult to perceive an editorial intention. The reason is because the user's editorial intention can be read by using a relevance between a plurality of editing behaviors and a relevance between an edited part and an unedited part, but these relevancies have not been considered in the conventional edit history information display method. For example, in the case of Adobe Premiere of Non-Patent Document 1, the management function of the edit history information such as "history" is difficult to visually find out the relationship since the edit history information is shown as a list. Meanwhile, in the editing support device of Patent Document 1, it has not been considered to display the edit history information at all.

A second problem is that a user cannot easily perceive an overview on a change in the whole content before and after editing. The reason is because in order to represent an overview on a change in the whole content before and after editing, it is necessary to calculate edit information representing a change in an overall configuration of the content before and after editing from the edit history information, but the management function of the edit history information such as "history" cannot extract an overview of a change in the whole content. Further, in the technique of Patent Document 1, there is a function of automatically generating the content according to a rule obtained from learned content, but there is no means of storing the editing behaviors conducted by the user as the edit history information, and explicitly displaying a change in the content. Thus, it is impossible to extract an overview of a change in the whole content.

Further, Patent Document 2 does not disclose expression of a moving state of a clip (section) inside the content before and after editing. Since it is impossible to obtain a part composed of sections, on which correction has been performed multiple times, interposed between sections that have not been corrected, it has been impossible to clearly understand the editorial intention by grouping the part and displaying association information between the pre-edit content and the post-edit content.

The present invention is made in light of the foregoing problems and provides an edit information provision device, an edit information provision method, a program, and a recording medium which are capable of providing the user's editorial intention and perceiving an overall edit content.

According to the present invention, there is provided an edit information provision device that provides a correspondence relationship between before and after editing in an editing process that performs correction on content having a time axis for each section, including an edited section information acquisition unit that associates a plurality of corresponding sections with each other, between a part of pre-edit content which includes a plurality of sections to be corrected, interposed in between sections not to be corrected, and a part of post-edit content which includes a plurality of corrected sections interposed in between uncorrected sections, and a provision unit that provides an association of the plurality of sections as one correspondence relationship.

Here, the edit information provision device refers to a device that extracts and displays a relationship between pre-edit content and post-edit content, two types of section information including an edited section and an unedited section, group information in which consecutive edited sections are collected, and edit information in which correspondence relationship information between the sections, between the groups, and between the section and the group is collected. The edit information provision device may display an overview of the edit content using the group information of the edit information and the correspondence relationship information between the groups, display the details of the edit content using the section information and the association information between the sections, or change the overview or the details of the edit content by input to the edit information provision device. In order to perceive the overall edit content, it is important to display the inter-group correspondence relationship information. The inter-group correspondence relationship information is one in which the correspondence relationship between the edited sections is collected between the content before and after editing. For this reason, when the edited sections between the content before and after editing belongs to the same group in each of the content before and after editing, by knowing the association information between the groups, the presence of the edited section in the associated groups and an overview of the edit content representing what kinds of edits have been performed are understood. That is, by replacing the correspondence relationship information between the edited sections in between the pre-edit content and the post-edit content with the correspondence relationship information between the groups, the correspondence relationship by the editing between the content before and after editing may be simply expressed. As a result, the overall of edited content may be perceived. Further, the content used here refers to content having time information such as moving image data or sound data but does not include content having no time information such as a text or a still image.

According to the present invention, there is provided an edit information provision method in an edit information provision device that provides a correspondence relationship between before and after editing in content for an editing process of performing correction on content having a time axis for each section, including associating a plurality of sections that correspond to each other between a part of pre-edit content which includes a plurality of sections to be corrected interposed between sections not to be corrected and a part of post-edit content which includes a plurality of sections that are corrected interposed between sections that are uncorrected, and providing an association of the plurality of sections as one correspondence relationship.

According to the present invention, there are provided a program causing a computer to function as the edit information provision device and a recording medium recording the program.

According to the present invention, the user's editorial intention can be provided, and the overall edit content can be perceived.

BEST MODE FOR CARRYING OUT THE INVENTION

Hereinafter, an edit information provision device according to embodiments of the present invention will be described with reference to the accompanying drawings. The following embodiments are embodiments in a case in which an edit information provision device according to the present application is applied.

First Embodiment

Figure 1:
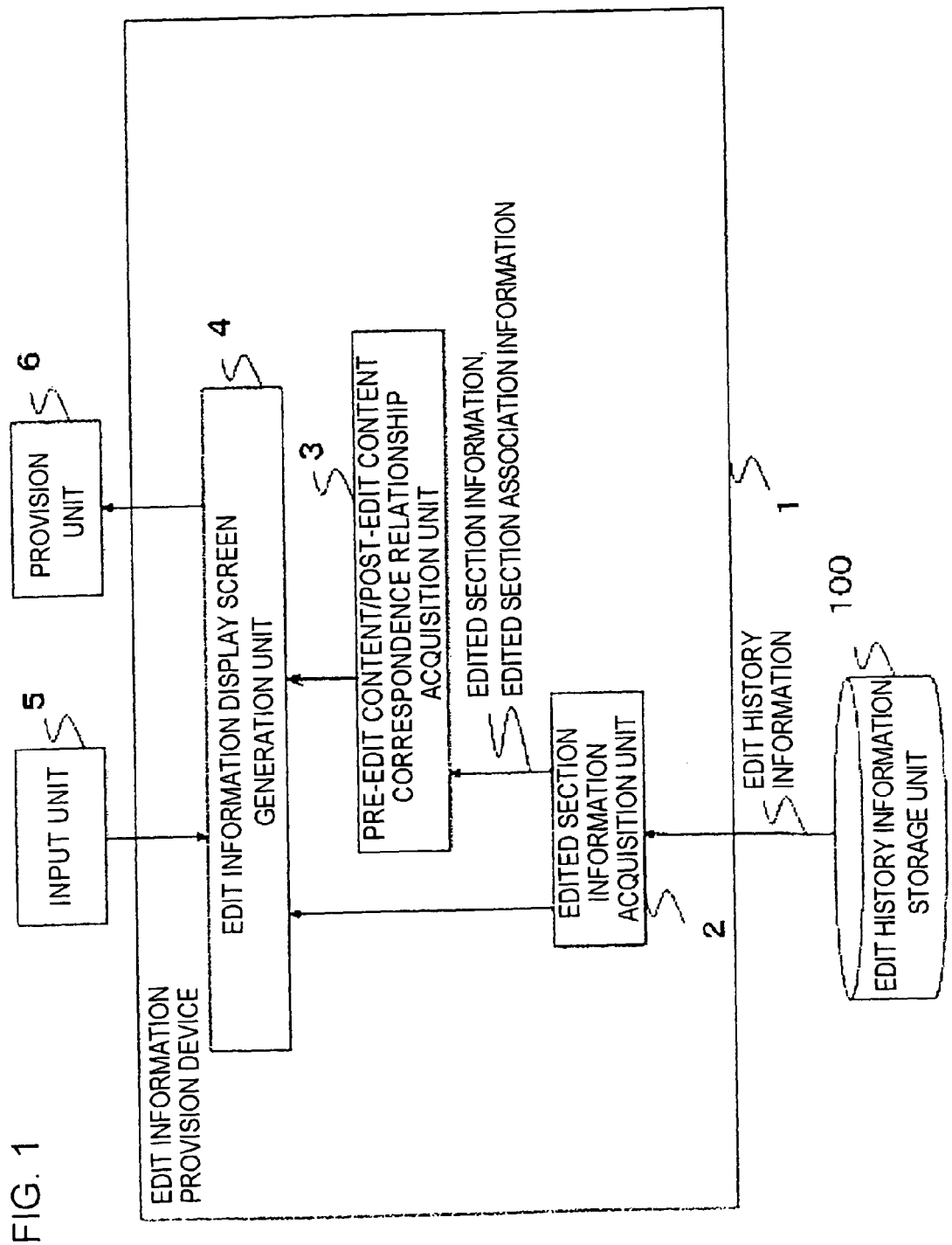
FIG. 1 is a diagram illustrating an example of a schematic configuration of an edit information provision device according to a first embodiment.

First, a configuration and a function of an edit information provision device according to a first embodiment of the present invention will be described with reference to FIG. 1. FIG. 1 is a diagram illustrating an example of a schematic configuration of an edit information provision device 1 according to the first embodiment.

As illustrated in FIG. 1, the edit information provision device 1 (an example of an edit information provision device) includes an edited section information acquisition unit 2, a pre-edit content/post-edit content correspondence relationship acquisition unit 3, an edit information display screen generation unit 4, an input unit 5, and a provision unit 6.

The edited section information acquisition unit 2 calculates edited section information based on edit history information. In the process of calculating the edited section information, the edited section information acquisition unit 2 associates an edited section of pre-edit content with an edited section of post-edit content generated by editing the edited section, and calculates the associated information as edited section association information.

Further, an ID of the content and an ID of the section inside the content are used for association of the edited sections. An association result for the IDs is generated as the edited section association information. That is, the edited section association information is generated by associating edited sections as a pair using a content ID and a section ID of the content of edited section information specifying an edited section, that is, by associating a combination of an ID of the pre-edit content and an ID specifying the edited section with a combination of an ID of the post-edit content and an ID specifying the edited section.

The edit history information refers to information in which an edit operation is recorded when editing a certain video. The edited section refers to a section altered by editing in the process of repeating an editing process, and indicates both a section of the pre-edit content to which the editing process is applied and a section on the post-edit content generated as the result of the editing.

The edited section information includes information specifying a section in which an edit has been made between the pre-edit content and the post-edit content, and information describing the details of editing process in which an edit has been made.

The pre-edit content/post-edit content correspondence relationship acquisition unit 3 groups consecutive edited sections based on the edited section information calculated by the edited section information acquisition unit 2, and generates group information specifying a group. At the time of generating the group information, an ID is generated for a group in the content and assigned to the group. For example, the group information is information in which an ID specifying each of a plurality of sections belonging to the same group is associated with an ID specifying the group.

The pre-edit content/post-edit content correspondence relationship acquisition unit 3 performs association between groups composed of the edited sections and association between the section and the group based on the edited section association information output from the edited section information acquisition unit 2.

An ID of the content and an ID of the group are used for association between the groups, and the association result by the IDs is generated as inter-group association information. As will be described later, the inter-group association information refers to either information in which an ID specifying the edited section in the pre-edit content is associated with an ID specifying the group in the post-edit content or information in which an ID specifying the group in the pre-edit content is associated with an ID specifying the edited section in the post-edit content under the assumption that they correspond to the same content ID each other.

Three IDs, that is, the content ID, the group ID, and the section ID are used for association between the section and the group, and the association result between the section and the group by the IDs is generated as section/group association information. For example, the section/group association information refers to one in which, in the pre-edit content and the post-edit content, groups retaining a common edited section are mutually associated by the group ID.

The input unit 5 transmits an input content from the user to the edit information display screen generation unit 4.

The edit information display screen generation unit 4 generates screen information based on 6 pieces of information, that is, the edited section information and the edited section association information of the edited section information acquisition unit 2, the group information, the intergroup association information, and the section/group association information of the pre-edit content/post-edit content correspondence relationship acquisition unit 3, and the input information of the input unit 5.

The provision unit 6 displays the screen information obtained from the edit information display screen generation unit 4.

Next, an operation of the edit information provision device 1 according to the first embodiment will be described.

First, the edited section information acquisition unit 2 acquires the edited section information and the edited section association information from the edit history information output from an edit history information storage unit 100.

The edit history information is usually recorded and stored for each section on which an edit operation has been performed. The stored information includes information representing the content of the edit operation, and information specifying the section on which an edit operation of the content before and after editing has been applied (a start time (a start frame), a finish time (a finish frame), a section length (the number of frames), or the like).

For example, if it is assumed that color correction has been performed on a section of content A ranging from a first second to a third seconds, as the edit history information, stored are information representing that color correction has been performed as an editing process, information representing that a time at which an application of the edit operation of the pre-edit content has started is the first second, information representing that a time at which an application of the edit operation of the pre-edit content has finished is the third second, information representing that a time at which the edit operation of the post-edit content has started is the first second, information representing that a time at which the edit operation of the post-edit content has finished is the third second, and information representing that the length of the section on which the edit operation has been performed is 2 seconds, respectively.

The edited section information includes an ID identifying the content in which the edited section is present, an ID identifying the edited section inside the content, details information of editing process, a section start time, a section finish time, and a section length.

The edit history information describes a change in the content point by point on each editing process, whereas the edited section information describes only a final change when the pre-edit content is compared with the post-edit content.

For example, when two editing processes of moving and deleting a section A of the pre-edit content are performed, the edit history information of the section A describes two pieces of information, that is, information related to movement of the section A that is the details of editing process and information related to deletion of the section A, whereas the edited section information of the section A describes only information related to deletion of the section A.

The edited section information acquisition unit 2 calculates the edited section information based on the edit history information. In the process of calculating the edited section information, a correspondence relationship between the edited section of the pre-edit content and the edited section of the post-edit content is calculated as the edited section association information.

The edited section association information is calculated by using, for example, a position change of the section represented by the edit history information, a change of the section length, and the like. For example, let us consider the case that a first edited content is generated by applying a first editing process to the pre-edit content, and a second edited content is generated by applying a second editing process to the first edited content. The edit history information represents association between the pre-edit content and the first edited content, and association between the first edited content and the second edited content. On the other hand, the edited section association information can represent association between the pre-edit content and the second edited content using the edit history information. That is, according to the edited section association information, section association can be made between the pre-edit content and the post-edit content, after which editing has been performed on the pre-edit content multiple times.

The edited section association information is generated by associating the edited sections as a pair with using a content ID and a section ID of the content of edited section information specifying an edited section.

Further, some edited sections such as a deleted or added section cannot be associated. For example, since deletion of the section is performed such that a section present before editing is deleted, an edited section that can be associated is not present in the post-edit content. Further, since addition of the section is performed by adding the edited section, the edited section that can be associated is not present in the pre-edit content. Some edited sections such as the deleted or added section are associated with an ID, prepared in advance, that represents a state in which there is no association between the sections.

The pre-edit content/post-edit content correspondence relationship acquisition unit 3 groups consecutive edited sections, and generates group information composed of the edited sections.

The pre-edit content/post-edit content correspondence relationship acquisition unit 3 generates the inter-group association information by associating the edited groups before and after editing, and generates the section/group association information by associating the edited section with the edited group. Grouping of the edited sections means that the sections being consecutive in time order inside each content of the pre-edit content and the post-edit content are collected into one.

The pre-edit content/post-edit content correspondence relationship acquisition unit 3 aggregates the edit information by grouping the edited sections.

Here, a group composed of the edited sections is referred to as an edited group.

The edited group is generated by collecting consecutive edited sections into one group based on start/finish time information of the section of the edited section information obtained from the edited section information acquisition unit 2. Meanwhile, when the edited sections are not consecutive, the edited group is generated by one section.

The generated edited group is assigned with a unique group ID inside the content. Further, each edited section information is assigned with a group ID of an edited group to which each edited section belongs.

Next, association between the edited groups before and after editing, and association between the section and the group are performed. The association between the edited groups is made by mutually associating the edited groups before and after editing (inter-edited group association). Meanwhile, the association between the section and the group is made by associating the edited section with the edited group.

The pre-edit content/post-edit content correspondence relationship acquisition unit 3 performs the above two kinds of association to generate the association information.

In the association between the groups before and after editing, the association between the edited groups before and after editing is performed based on the group information composed of the edited sections and the edited section association information obtained from the edited section information acquisition unit 2.

The association result of the edited groups is generated as inter-edited group association information.

The inter-edited group association information refers to information in which the edited section association information is aggregated in units of groups.

Figure 2:
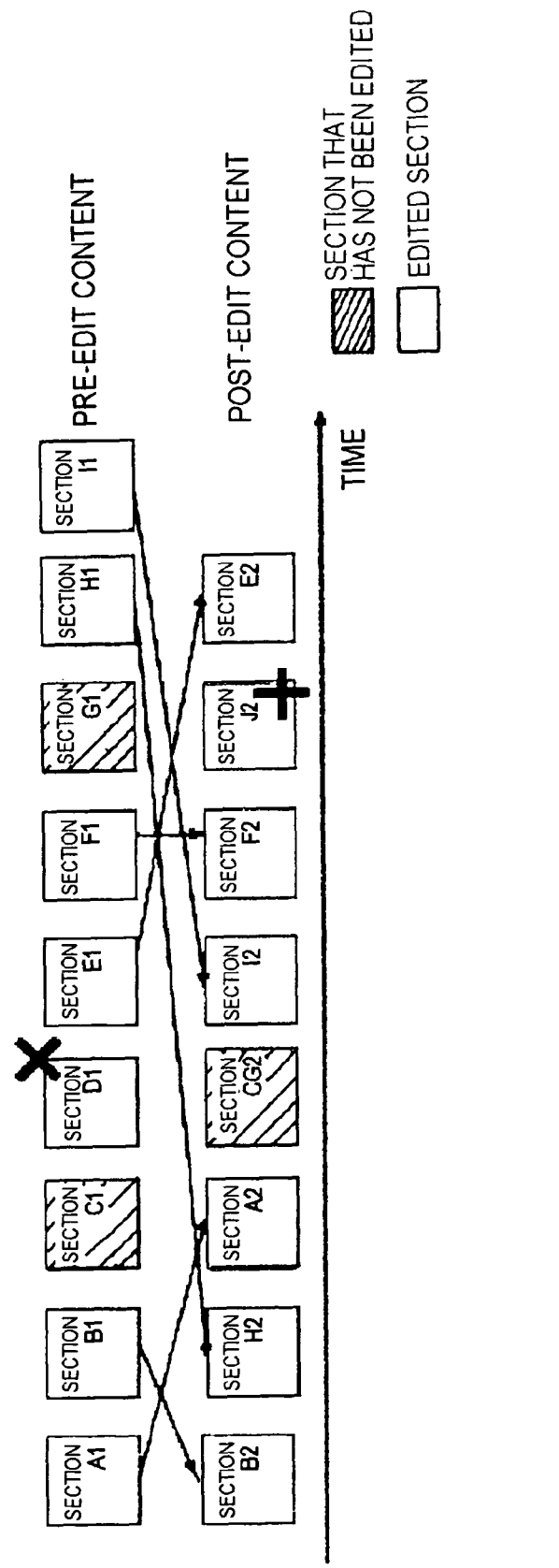
FIG. 2 is a diagram illustrating an example of an association between edited sections.
Figure 3:
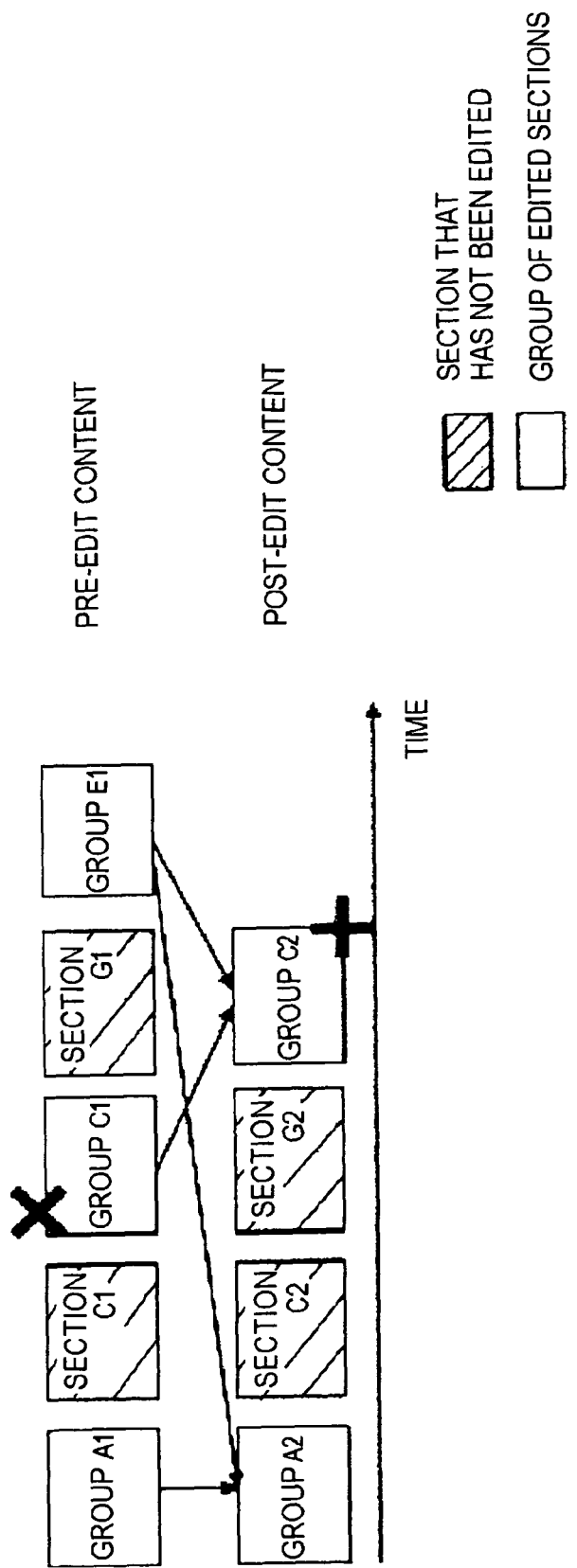
FIG. 3 is a diagram illustrating an example of edited inter-group association information obtained by aggregating an association between edited sections in unit of groups.

FIG. 2 is a diagram illustrating an example of the edited section association information. FIG. 3 is a diagram illustrating the inter-edited group association information obtained by aggregating the edited section association information in units of groups on an example illustrated in FIG. 2. Arrowed lines of FIGS. 2 and 3 represent associations. An X mark of FIG. 2 represents a deleted section, an X mark of FIG. 3 represents that a deleted section is present in a group. A + mark of FIG. 2 represents an added section, and a + mark of FIG. 3 represents that an added section is present in a group.

Association between groups is performed by converting association between the edited sections before and after editing, which is illustrated in FIG. 2, into association between groups to which the section belongs, which is illustrated in FIG. 3. The ID of the section of the edited section information and the group ID are used for converting association between the sections into association between the groups. A section ID associated with each group ID of the pre-edit content is obtained from the group information composed of the edited sections. Next, a section ID of the post-edit content that forms a pair with the section ID is obtained from the edited section association information. Finally, a group ID to which each obtained section ID of the post-edit content belongs is obtained. As a result, the edited groups can be associated with each other.

A description will be made on the examples illustrated in FIGS. 2 and 3. Firstly, it is understood that sections that correspond to a group A1 of the pre-edit content are a section A1 and a section B1. Next, it is understood that sections of the post-edit content that respectively correspond to the section A1 and the section B1 of the pre-edit content are a section A2 and a section B2. Further, it is understood that the section A2 and the section B2 belong to a group A2 of the post-edit content. As a result, association from the group A1 to the group A2 is obtained. The association result is generated as the intergroup association information.

When association between the same groups is generated from association between the edited sections, associations between the groups are grouped into one. For example, the section A1 and the section B1 of the pre-edit content illustrated in FIG. 2 belong to the group A1 illustrated in FIG. 3. Meanwhile, the section A2 and the section B2 belong to the group A2 illustrated in FIG. 3. The section A1 is associated with the section A2, and the section B1 is associated with the section B2. When two associations are present between the group A1 and the group A2 as described above, the associations between the group A1 and the group A2 are grouped into one association. That is, information representing that the section A1 is associated with the section A2 and information representing that the section B1 is associated with the section B2 are grouped into one association information representing that the groups A1 and A2 before and after editing correspond to each other.

Finally, association between the section and the group is performed between the pre-edit content and the post-edit content.

That is, association between the edited group and the edited section is performed between the pre-edit content and the post-edit content using the edited section association information and the group information composed of the edited sections. Next, section ID information and group ID information are acquired from the group information. Section ID information that becomes a pair is acquired from the edited section association information. Here, the edited section and the group information can be associated between the pre-edit content and the post-edit content by associating the acquired section ID with the section ID of the group information.

A description will be made on the examples illustrated in FIGS. 2 and 3. First, it is understood from the group information composed of the edited sections that the group A1 of the pre-edit content is composed of the section A1 and the section B1. Further, it is understood from the edited section association information that the section A1 is associated with the section A2 and the section B1 is associated with the section B2. As a result, association from the section A2 and the section B2 of the post-edit content to the group A1 is obtained.

Further, it is understood from the group information composed of the edited sections that the group A2 of the post-edit content is composed of the section A2 and the section B2. Further, it is understood from the association information between the edited sections that the section A2 is associated with the section A1 and the section B2 is associated with the section B1. As a result, association from the section A1 and the section B1 of the post-edit content to the group A2 is obtained.

As described above, association between the section of the pre-edit content and the group of the post-edit content and association between the group of the pre-edit content and the section of the post-edit content are performed.

Figure 4:
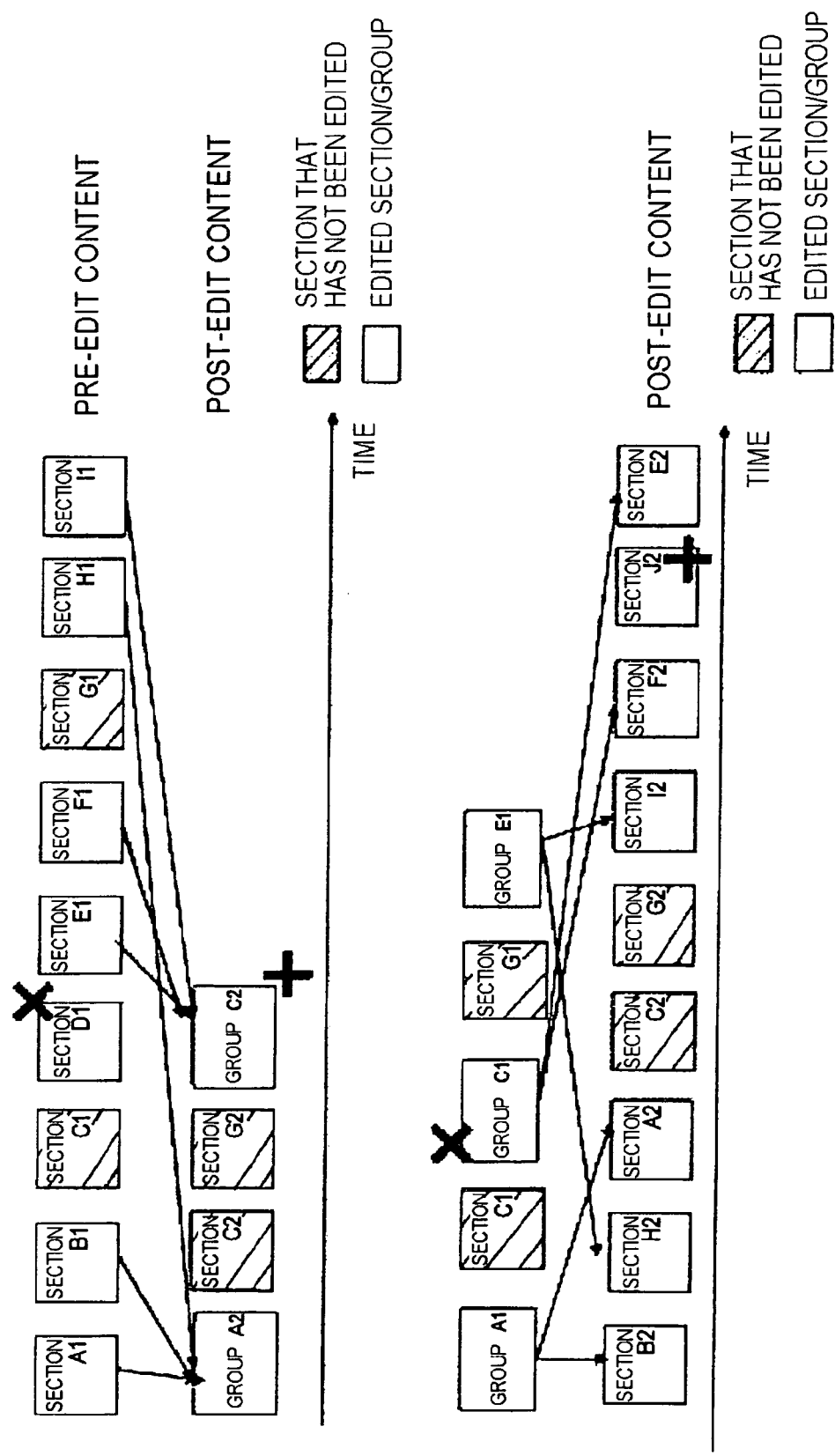
FIG. 4 is a diagram illustrating a relationship between a section and a group in video, using a result of associating a section ID of pre-edit content to a group ID of post-edit content, and a result of associating a group ID of pre-edit content to a section ID of post-edit content.

FIG. 4 is a diagram illustrating a result of associating the section ID of the pre-edit content with the group ID of the post-edit content and a result of associating the section ID of the post-edit content with the group ID of the pre-edit content when the sections are associated with each other as illustrated in FIG. 2.

The edit information display screen generation unit 4 generates the screen information based on 6 pieces of information, that is, the edited section information and the edited section association information output from the edited section information acquisition unit 2, the group information, the intergroup association information, and the section/group association information output from the pre-edit content/post-edit content correspondence relationship acquisition unit 3, and the input information output from the input unit 5. The screen information includes the pre-edit content, the post-edit content, and associations between the sections included in the content and the groups inside the content or between the contents.

Each content of the screen information is expressed by components of the section and the group. The components are objects respectively associated with each section information and each group information. The component of the section includes two types of components, that is, an edited section component associated with the edited section information, and a component, other than the edited section component, that is present between non-consecutive edited section components, that is, a the component corresponding to a section that is not edited. Meanwhile, the component of the group includes an edited group component associated with the group information composed of the edited sections.

In the provision unit 6, the components are expressed by graphic such as a text, an image, a video, or the like.

Figure 5:
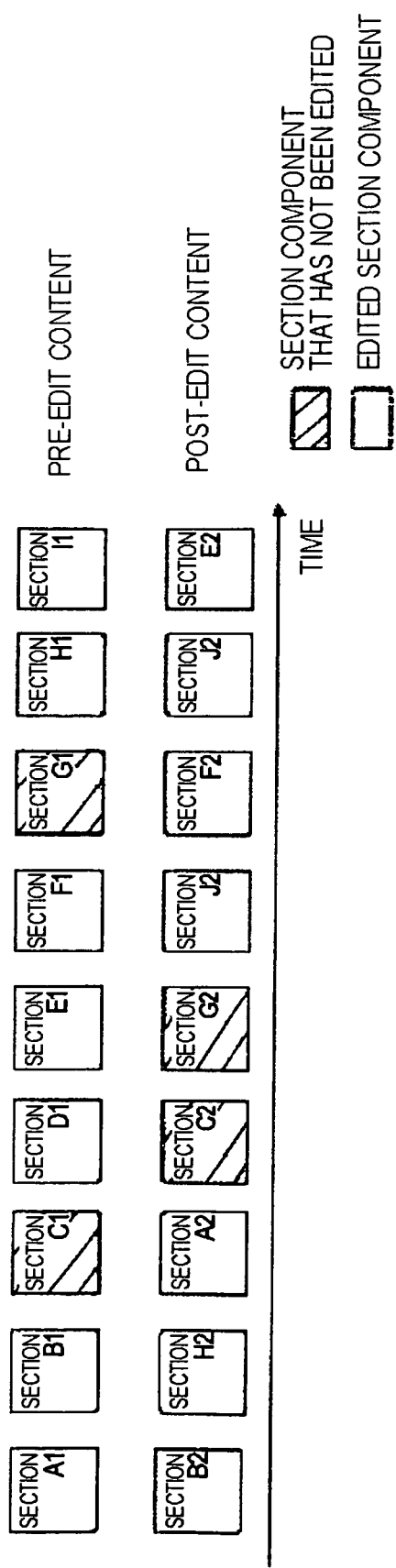
FIG. 5 is a diagram illustrating information of each section as a component.

As illustrated in FIG. 5, the section components are arranged in time order for each content before and after editing based on the start time and the finish time of the edited section information.

By using the edited section association information for this, the screen information using the section (here, an edited section is interpreted as an edited section component and a section that has not been edited is interpreted as a component that has not been edited) illustrated in FIG. 2 and the section association information is generated.

Figure 6:
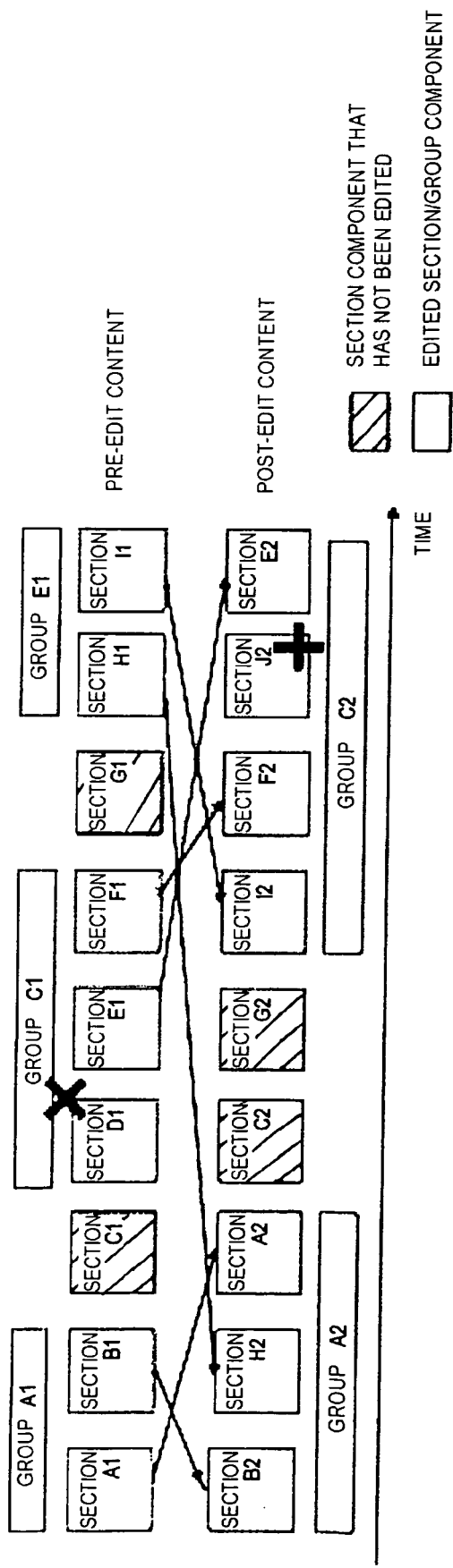
FIG. 6 illustrates screen information in which an edited section component associated with an edited group component.

Since the section information of each edited section component corresponds to the section ID of the group information of the edited group, as illustrated in FIG. 6, it is possible to generate the screen information in which the edited group component is associated with the edited section component.

In the screen information displayed by accompanying the edited section component with and the edited group component to which the edited section component belongs, the screen information expressed only by the edited group component in which the edited section components are aggregated can be generated by selecting the edited group component through the input unit 5. The aggregation of the edited section components refers to expressing apart of the content, expressed by the edited section component, by the edited group component.

Figure 7:
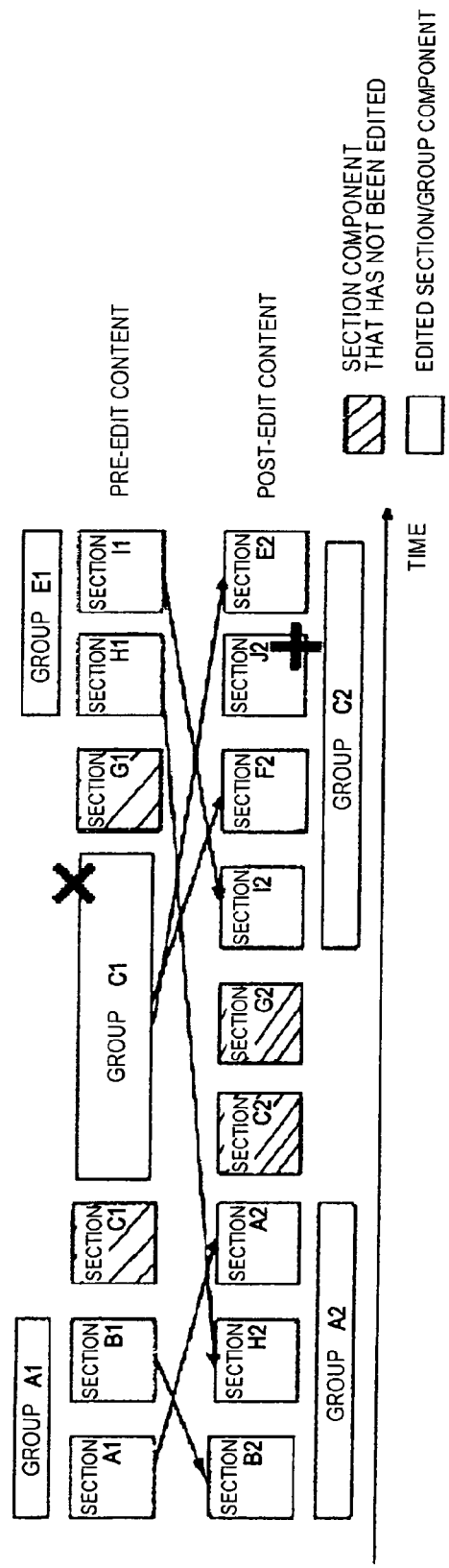
FIG. 7 is a diagram illustrating an example of screen information representing that consecutive edited section components of the FIG. 6 can be aggregated by an edited group component.

For example, when one group C1 that is the edited group component illustrated in FIG. 1 is selected through the input unit 5, as illustrated in FIG. 7, the screen information in which all of the edited sections of the group C1 are aggregated into the group C1 can be generated. Further, the screen information in which the edited section component illustrated in FIG. 3 is configured only with the edited group component can be generated by selecting the edited group component illustrated in FIG. 6 and aggregating all of the edited section components. Here, the edited group illustrated in FIG. 3 is interpreted as the edited group component.

Figure 8:
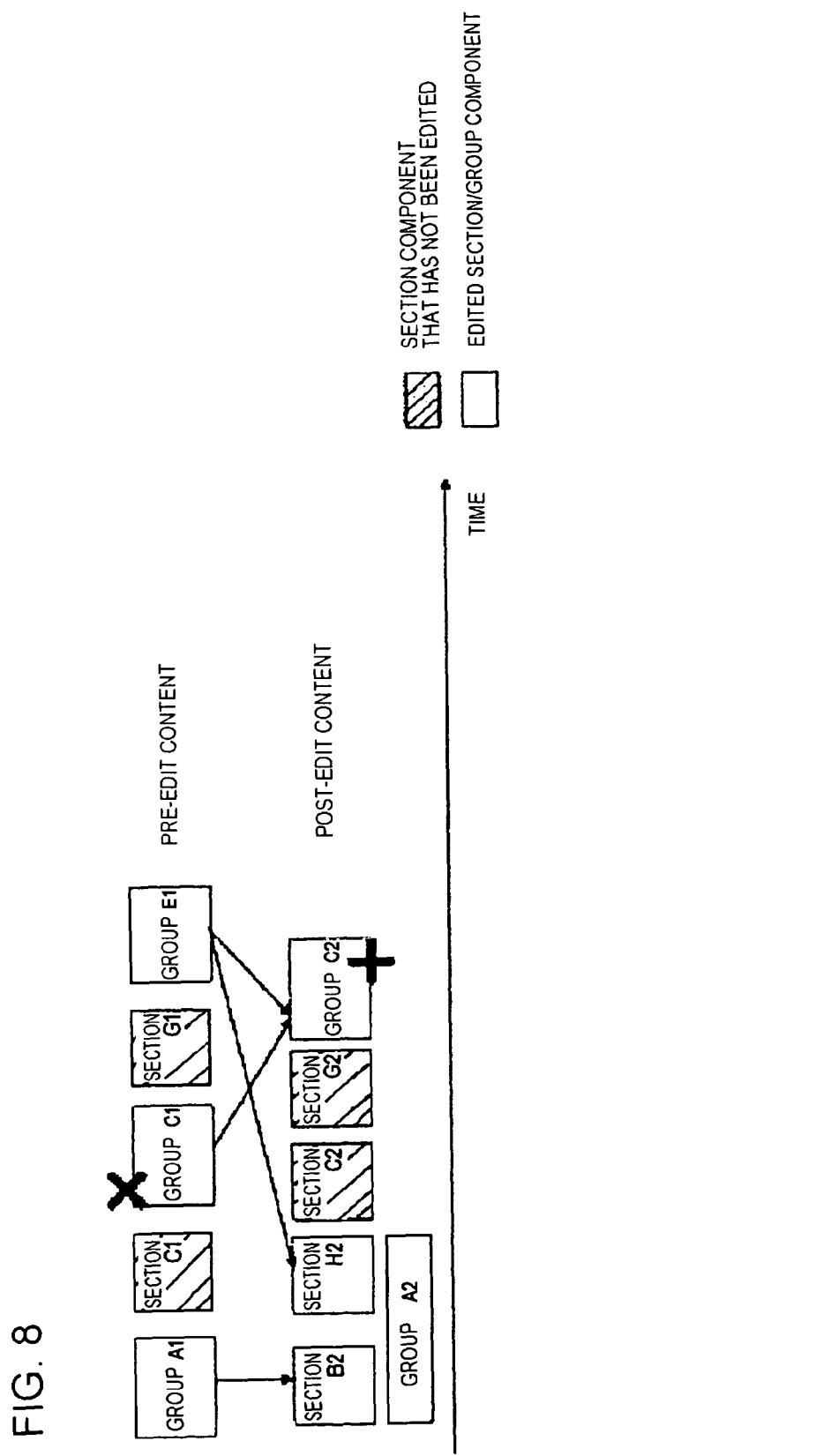
FIG. 8 is a diagram illustrating that screen information using both an edited section component and an edited group component can be generated.

Meanwhile, the screen information as illustrated in FIG. 8 expressed by both the edited section component and the edited group component can be generated by aggregating some of the edited group components illustrated in FIG. 6 through the input unit 5.

Contrary to the aggregation, the aggregated group component can be developed to the screen information accompanied by the original section component and the group component to which the section component belongs. For example, when one aggregated group C1 that is the group component illustrated in FIG. 7 is selected through the input unit 5, as illustrated in FIG. 6, all of the sections of the group C1 are displayed.

Further, when the group components in which the section components illustrated in FIG. 3 are aggregated are all selected through the input unit 5, it is possible to generate the screen information of FIG. 6 that is all converted to the selected group components and the section components belonging to the group components.

Meanwhile, by developing some of FIG. 3, it is possible to generate the screen information in which the edited section component and the edited group component are mixed and associated between the pre-edit content and the post-edit content that correspond to each other, which is illustrated in FIG. 8.

The group association information is used for association between the edited group components. Further, the section/group association information is used for association between the section component and the group component.

Further, when the section component or the group component is selected by input through the input unit 5, the screen information in which the section component, the group component, and the association between the components are emphasized can be generated.

Figure 9:
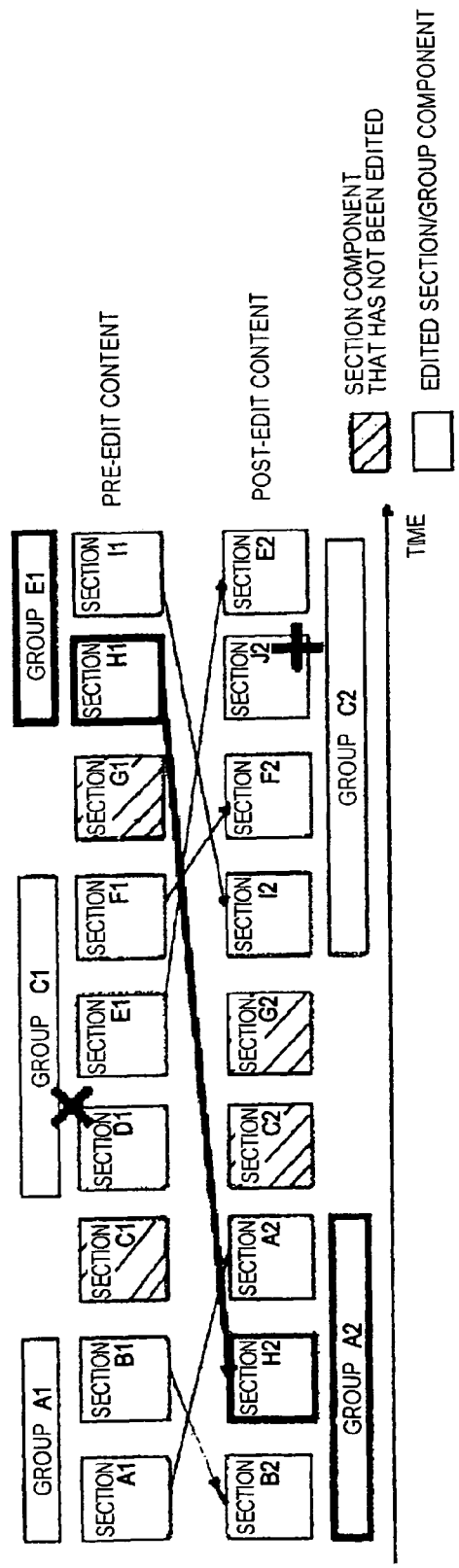
FIG. 9 is a diagram illustrating that when a section component is selected, it is possible to generate screen information that highlights the selected section component and a group component to which the selected section component belongs, and a section component associated with the selected section component and a group component to which the associated section component belongs.

FIG. 9 is a diagram illustrating that when one section component H1 is selected by the input unit 5, a group E1 to which the section belongs, an associated section H2, and a group A2 of the associated section are emphasized.

Figure 10:
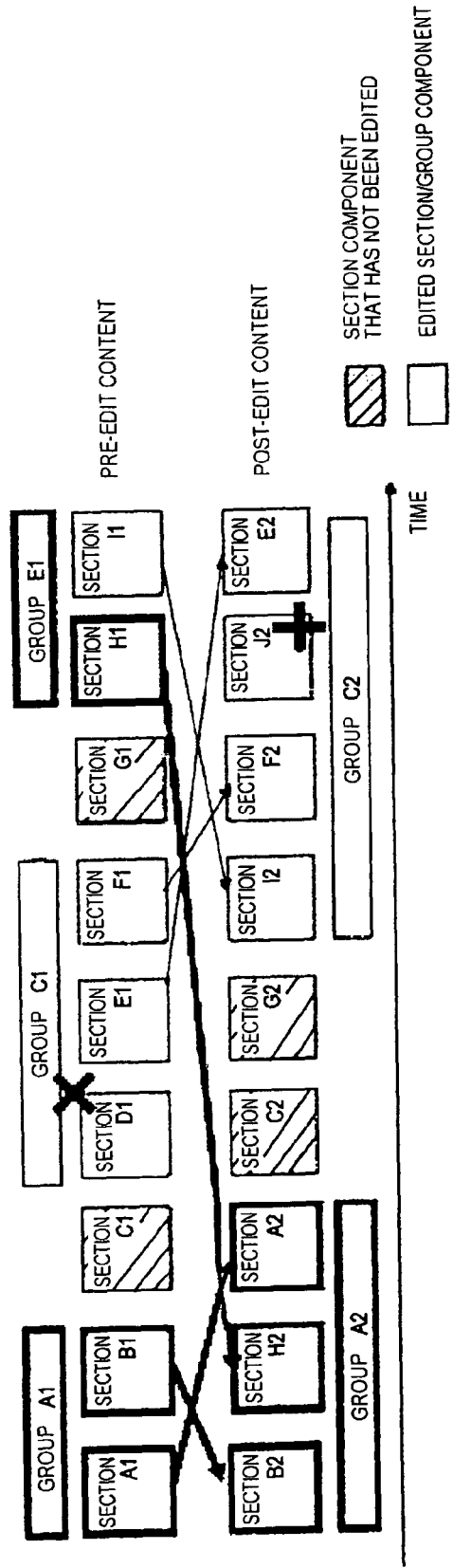
FIG. 10 is a diagram illustrating that when a group component is selected, it is possible to generate screen information that highlights the selected group component and a section component belonging to the selected group component, and a group component associated with the selected group component and a section component belonging to the group component.

FIG. 10 is a diagram illustrating that when the group component A2 of the post-edit content is selected by the input unit 5, section components B2, H2, and A2 of the selected group component, associated group components A1 and E1, and associated section components A1, B1, and H1 are emphasized.

The input unit 5 receives the user's input for selecting the section component or the group component. The input is used for changing the screen information of the edit information display screen generation unit 4 such as aggregation, development or emphasis of the section component and the group component.

For example, when the group C1 expressed by section components D1, E1, and F1 of FIG. 6 is selected through the input unit 5, an instruction is output to the edit information display screen generation unit 4 to generate the screen information in which the section components are aggregated as in the group component C1 illustrated in FIG. 7.

On the contrary, when the group component C1 illustrated in FIG. 7 is selected through the input unit 5, an instruction is output to the edit information display screen generation unit 4 to generate the screen information developed into the group C1 expressed by the section components D1, E1, and F1 illustrated in FIG. 6.

Meanwhile, when the section component H2 is selected by the input unit 5, an instruction is output to the edit information display screen generation unit 4 to emphasize the group A2 to which the section component H2 belongs, the section component H1 associated with the section component, and the group component E1 as illustrated in FIG. 9.

Further, as a method of selecting aggregation, development or emphasis through the input unit 5, there are a click by a mouse, a method of using a menu screen, and the like.

For example, aggregating the section components or the group components may be performed by double-clicking the component, and emphasizing the component may be performed by single-clicking the component.

Meanwhile, by single-clicking the component, a menu of the component may be displayed, and aggregation, development, or emphasis to be applied to the component may be selected.

Further, when a touch screen (a touch panel) into which the input unit 5 and the provision unit 6 are integrated is used, similarly to the case of the mouse, there are a method of clicking or double-clicking by a stylus or a finger and a method of displaying a menu by pressing the component for a long time and performing selection.

The provision unit 6 provides the screen information generated by the edit information display screen generation unit 4.

As described above, according to the present embodiment, it is possible to easily perceive an overview or the details of the editing result by aggregation or development of the edit information, and an editorial intention using a relationship of an edit history.

Second Embodiment

Next, an edit information provision device according to a second embodiment of the present invention will be described with reference to the drawings.

First, a configuration and a function of the edit information provision device according to the second embodiment will be described.

An overall configuration of the edit information provision device according to the second embodiment is similar to that of the edit information provision device 1 illustrated in FIG. 1 but different in that the edited section information acquisition unit 2 performs an importance judgment of an edit history.

Figure 11:
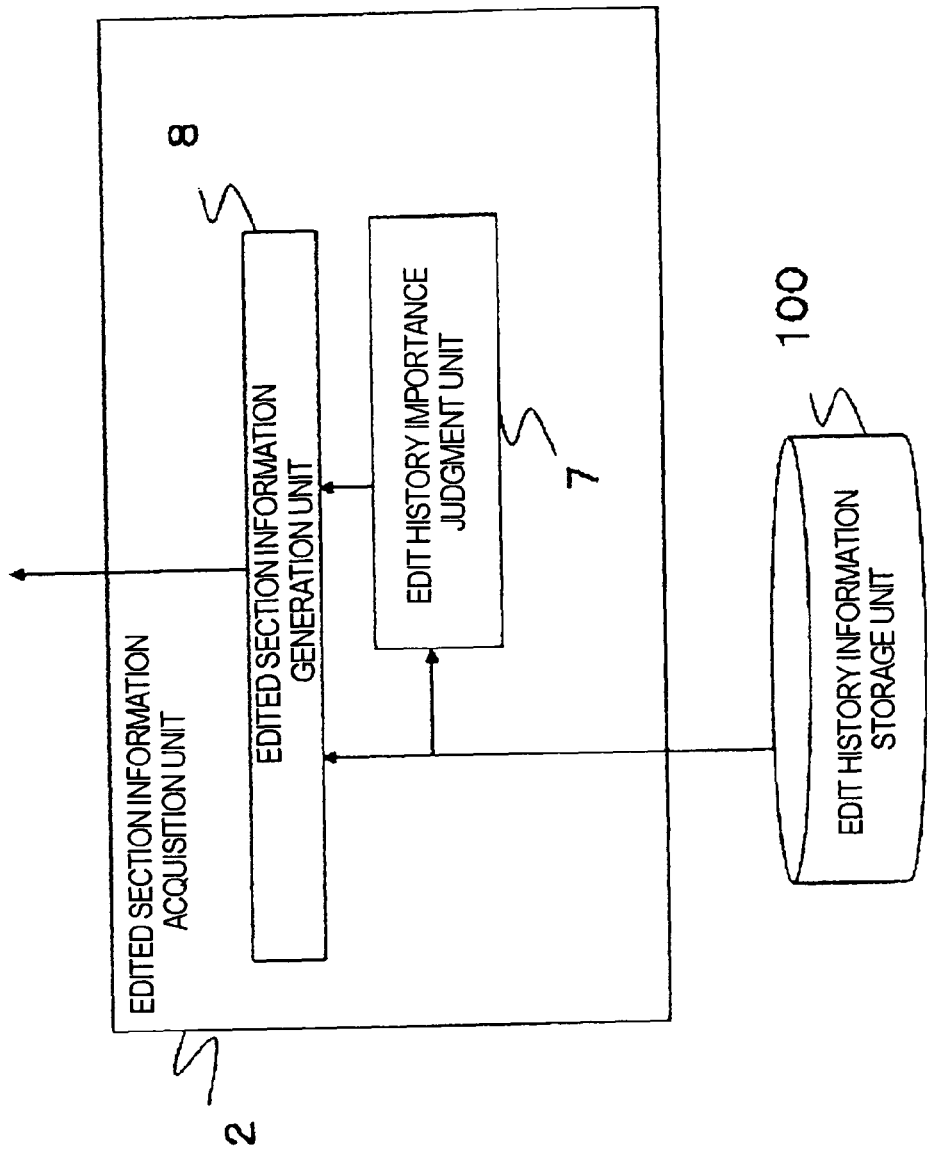
FIG. 11 is a diagram illustrating an example of an edited section information acquisition unit of an edit information provision device according to a second embodiment.

FIG. 11 is a diagram illustrating the edited section information acquisition unit 2 in the edit information provision device according to the second embodiment.

The edit information provision device according to the second embodiment is configured such that an edit history importance judgment unit 7 that calculates an importance of the edit history information of the edit history information storage unit 100 is added to the edited section information acquisition unit 2 and the edited section information acquisition 2 includes two components, that is, the edit history importance judgment unit 7 and an edited section information generation unit 8.

The edit history information may include information that is not particularly useful in perceiving a change in an overall configuration of a content before and after editing since an editing process is too delicate. For example, in the case of a video content, there is a delicate editing process such as deletion of several frames or color correction. A function of hiding a change in the content before and after editing illustrated in FIG. 6 at the time of displaying is implemented by the edit history importance judgment unit 7.

The edit history importance judgment unit 7 calculates an importance of each editing process stored as the edit history information. The edit history importance judgment unit 7 generates data in which the edit history is associated with the importance. For example, the importance refers to information representing a degree of a change in the editing process and is used for a judgment as to whether or not the edit history information can be used in perceiving an overview of a change in the content. The value may be decided based on the details of editing process, the section length to which the editing process is applied, a change in contrast, the presence/absence of deletion of the section, or the like.

For example, in the details of editing process, the importance is set to a small value in the case of a change in the size of the contrast of the video content, cutting of minute noise of the voice content, or the like. In the section length to which the editing process is applied, since influence on the content increases as a length of the section of the editing process increases, the importance is set to a high value. In the case of a short edited section less than 1 second, since influence on the content is small, the importance is set to a small value. A method of setting the importance that is decided by the details of editing process or the section length of the editing process may change based on a user's taste. For example, a high importance may be set even to the short edited section.

The edited section information generation unit 8 calculates edited section information/edited section association information from the edit history information and the data in which the history obtained from the edit history importance judgment unit 7 is associated with the importance. The edited section information generation unit 8 judges that the edited section extracted from the edit history having the importance equal to or less than a predetermined threshold value does not have the special meaning, and deals the extracted edited section as one that has not been generated.

Instead of the extracted edited section, sub section information that is information of a section having the importance equal to or less than the threshold value is generated. The sub section information includes information representing the edited section having the importance equal to or less than a certain threshold value, and includes a start/finish time, a section length, and a sub section ID identifying itself.

In the case in which the edited section information is generated in the edited section information generation unit 8, when a sub section is present in a certain edited section, it is associated with the edited section information. Meanwhile, when no sub section is present in any edited sections, the sub section is converted into the edited section information and retained together with the previously generated edited section information. The sub section that is not included in the edited section is present in a section that has not been edited. For this reason, in order for the sub section not to be included in the section that has not been edited, the sub section is dealt as the edited section, and the sub section information is converted into the edited section information.

Figure 12:
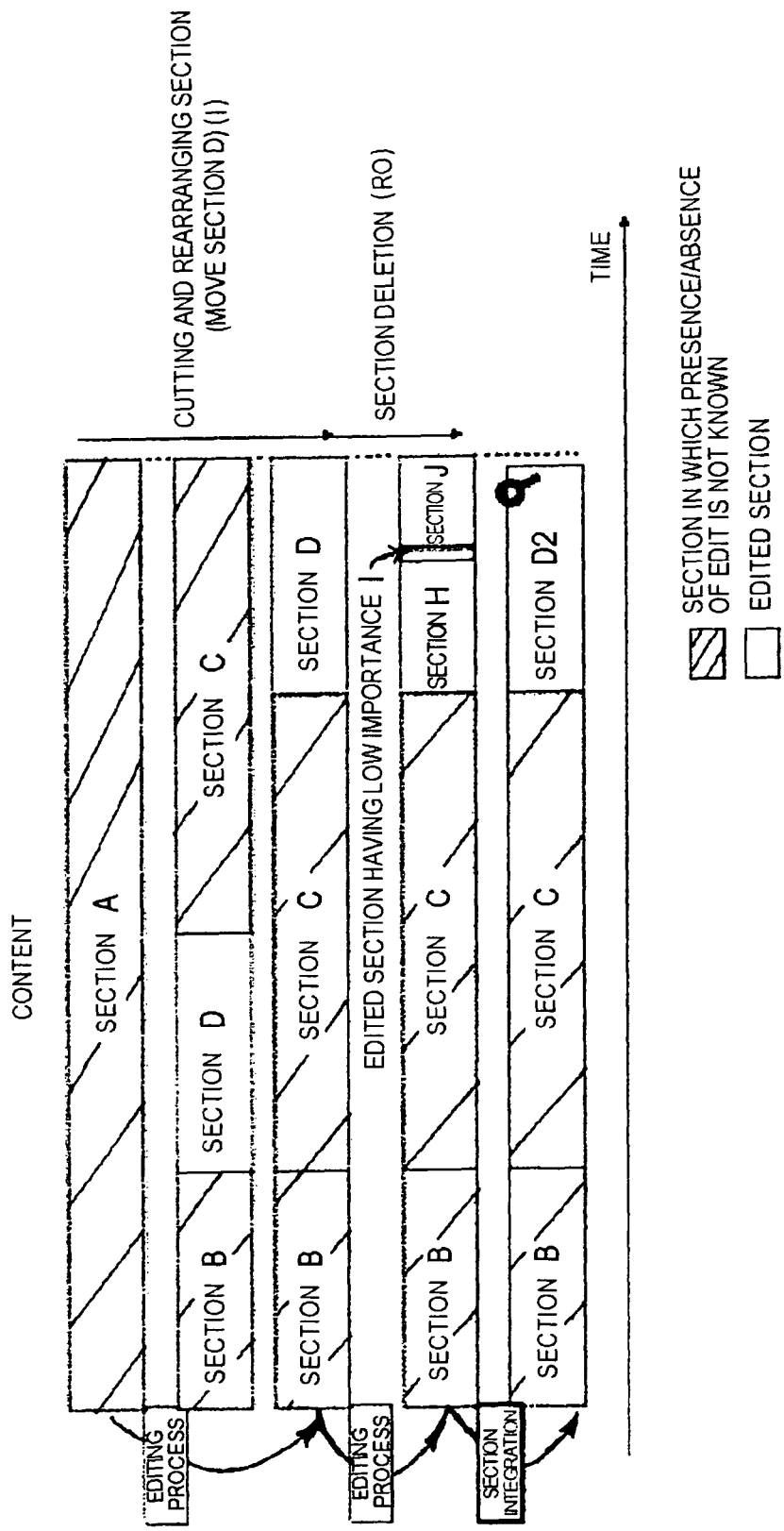
FIG. 12 is a diagram illustrating an example of merging an edited section extracted from edit history information having a low importance.

FIG. 12 is a diagram illustrating an example of merging an edited section extracted from an edit history having a low importance. FIG. 12 illustrates the process of calculating edited section information of the content from the edit history information extracted from the edit history having a low importance.

In the editing process of FIG. 12 on the content, section cutting and rearranging (1) and section deletion (2) have been performed. It is assumed that the section deletion (2) has been applied to several frames, and an importance obtained by the edit history importance judgment unit 7 is low.

In cutting and rearranging of the section (1), the section A has been cut and rearranged.

Further, in the section deletion (2), a section I present in a section D is deleted. Since the section I is equal to or less than a certain threshold value, the section I is registered as the sub section, the section D remains as the edited section, and the section I is dealt as one which has not been generated (deleted). Here, a section H and a section J between which the section I has been deleted from are merged into a section D2.

Figure 13:
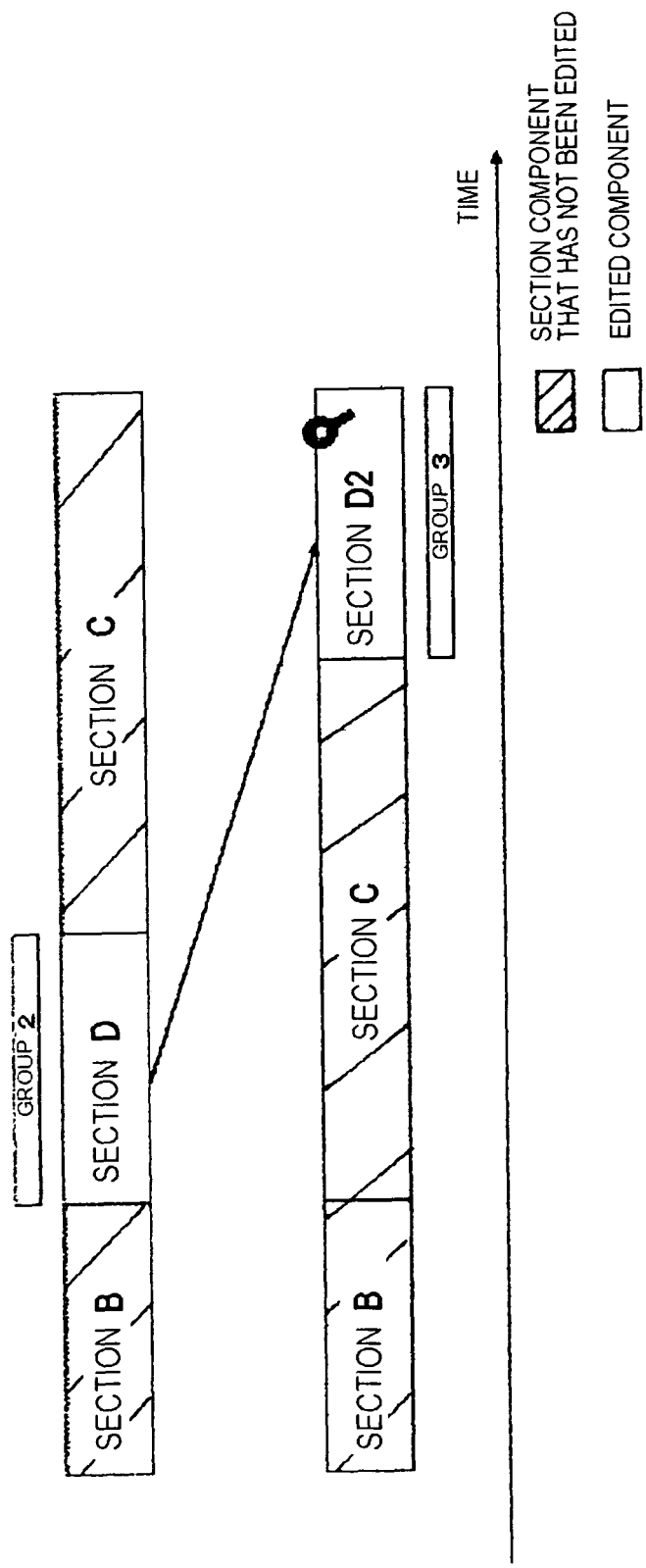
FIG. 13 is a diagram illustrating an example of a screen of an edit information display screen generation unit using sub section information.

FIG. 13 is a diagram illustrating an example of the screen information of the edit information display screen generation unit 4 using the sub section information. In FIG. 13, information representing a section having sub section information may be added in addition to the screen information illustrated in FIG. 6. A magnifier picture illustrated in FIG. 13 represents that sub section information is present in a section.

Figure 14:
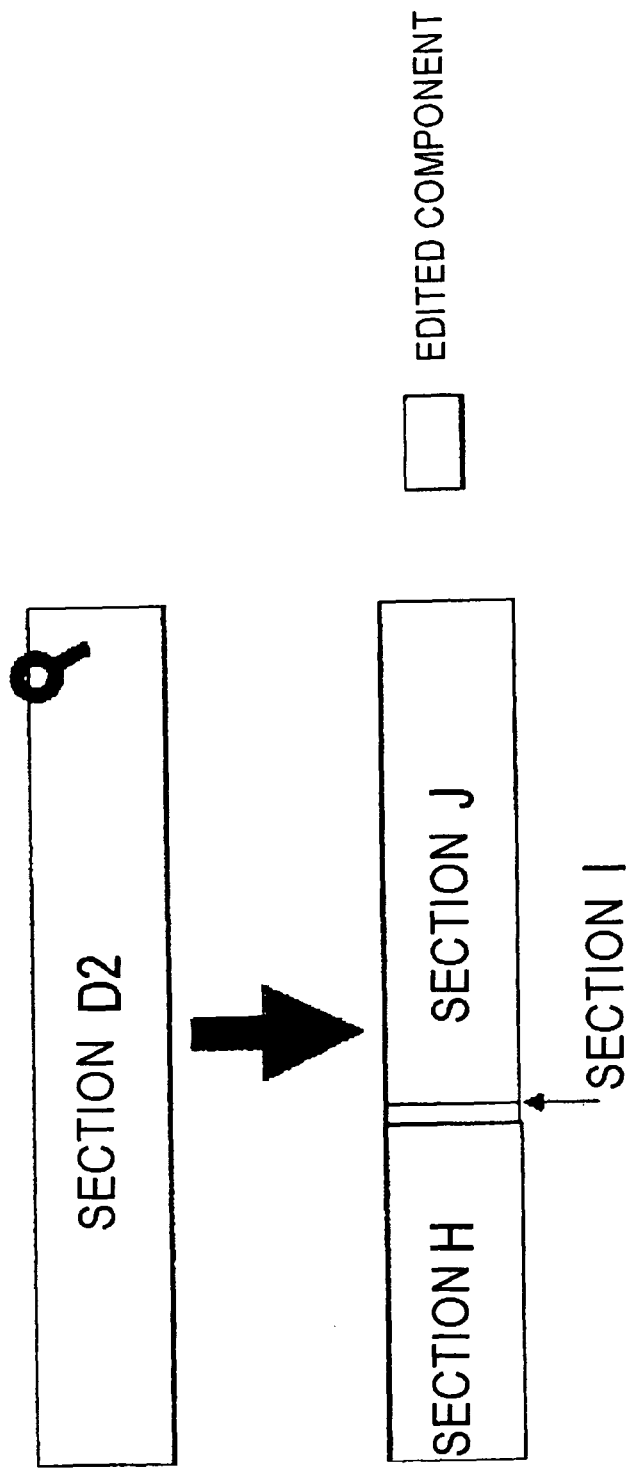
FIG. 14 is a diagram illustrating an example of a method of displaying the presence/absence of sub section information inside a section and displaying sub section information from section information.

When the section component with the magnifier is selected by input from the input unit 5, the edit information display screen generation unit 4 may generate the screen information of FIG. 14 for displaying the sub section.

As described above, according to the present embodiment, an edited section that is delicate in the editing process is regarded as the sub section, and by hiding the sub section when providing a change in content before and after editing, it is possible to easily perceive an overview on a change in the content before and after editing.

Third Embodiment

Next, an edit information provision device according to a third embodiment of the present invention will be described with reference to the drawings.

First, a configuration and a function of the edit information provision device according to the third embodiment will be described.

An overall configuration of the edit information provision device according to the third embodiment is similar to that of the edit information provision device 1 illustrated in FIG. 1 but different in that in the edit information display screen generation unit 4, when the component of the edited section or the section that has not been edited is the same between the pre-edit content and the post-edit content, by arranging in a direction that vertically intersects with a time axis, an arrangement is made so that a user can easily confirm a change in content by editing.

Figure 15:
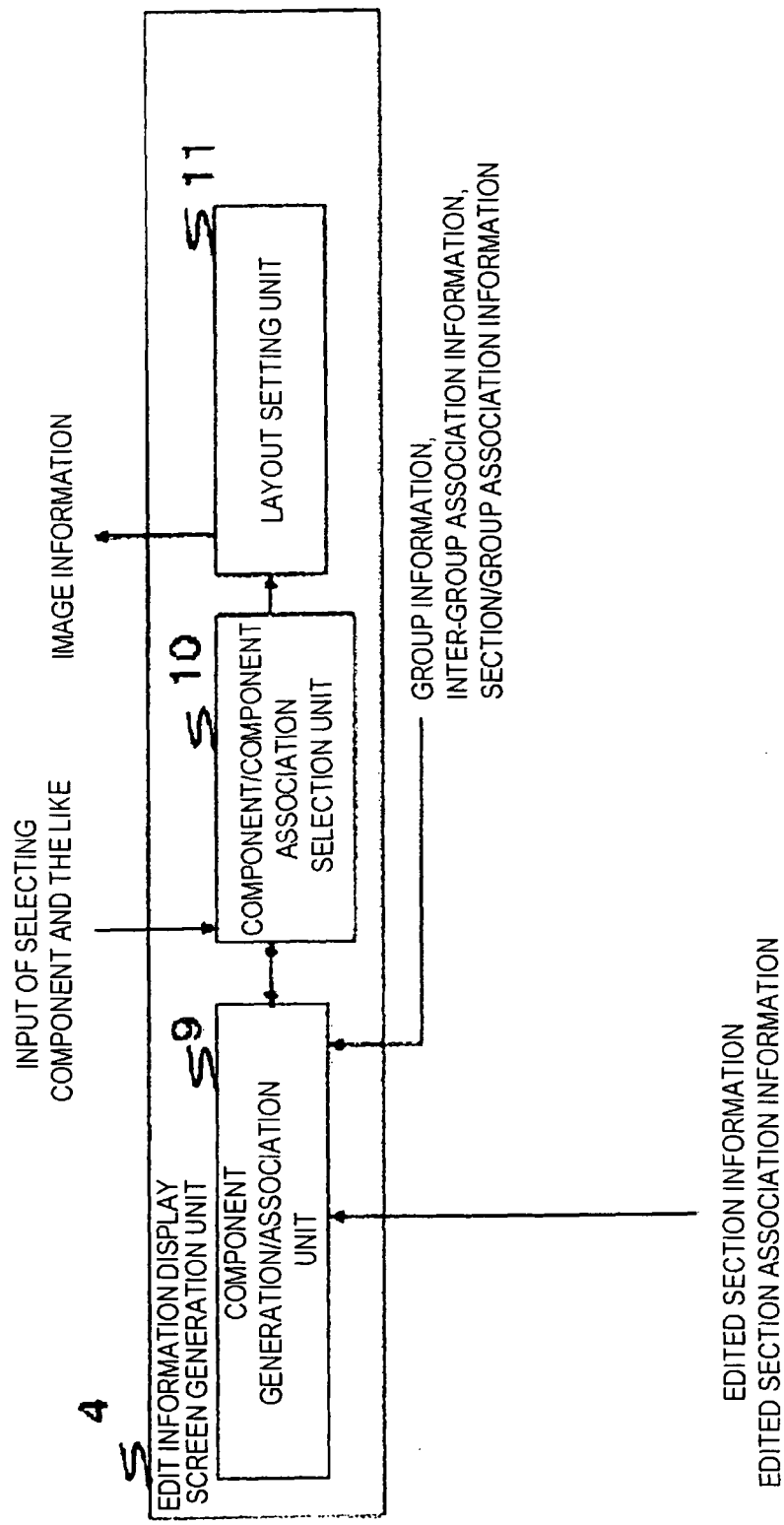
FIG. 15 is a diagram illustrating an example of an edit information display screen generation unit of an edit information provision device according to a third embodiment.

FIG. 15 is a diagram illustrating the edit information display screen generation unit 4 in the edit information device according to the third embodiment, where a layout setting unit 11 is added to the edit information display screen generation unit 4 of FIG. 1 and a function thereof is divided in more detail.

As illustrated in FIG. 15, the edit information display screen generation unit 4 includes a component generation/association unit 9, a component/component association selection unit 10, and a layout setting unit 11.

The component generation/association unit 9 generates three components, that is, a section component that has not been edited, an edited section component, and an edited group component. The component refers to an object respectively associated with each section, information and each group information as described above.

The component/component association selection unit 10 aggregates the section component based on an input received from the input unit 5 as illustrated in FIGS. 8 to 10, and generates the screen information in which the group component is developed or the screen information in which a correspondence relationship between the components is emphasized.

The layout setting unit 11 arranges the same component between the pre-edited component and the post-edited component vertically to the time axis by using the fact that an arrangement order and a section length of the section component that has not been edited do not change between the content before and after editing.

Next, an operation of the edit information provision device according to the third embodiment will be described.

First, the section component, which has not been edited, corresponding between the pre-edit content and the post-edit content is arranged in a direction that vertically intersects with a time axis.

There is generated a set of the edited section component and the edited group component interposed between the vertical arranged section components that have not been edited.

Inside each set, when the same edited section components are present between the pre-edit content and the post-edit content, the edited components are arranged in a vertical intersecting direction. Meanwhile, when the same edited section components are not present between the pre-edit content and the post-edit content, that is, when the component of the same edited section is present in a different set or when the edited section component is not present because of the editing process, in order to clearly specify them, the edited section component is not arranged in the same row, a space is inserted in a direction that vertically intersects with the edited section component to adjust a layout.

When the edited section component belongs to the pre-edit content, the space is inserted into the post-edit content, and when the edited section component belongs to the post-edit content, the space is inserted into the pre-edit content. Since the contents of the group in the content before and after editing have been edited, the edited group component does not have a same corresponding group component. Thus, it is necessary to insert the space. A method of inserting the space is similar to the case of the edited section component, and when the non-corresponding edited group component belongs to the pre-edit content, the space is inserted into the post-edit content, but when the non-corresponding edited group component belongs to the post-edit content, the space is inserted into the pre-edit content.

Figure 16:
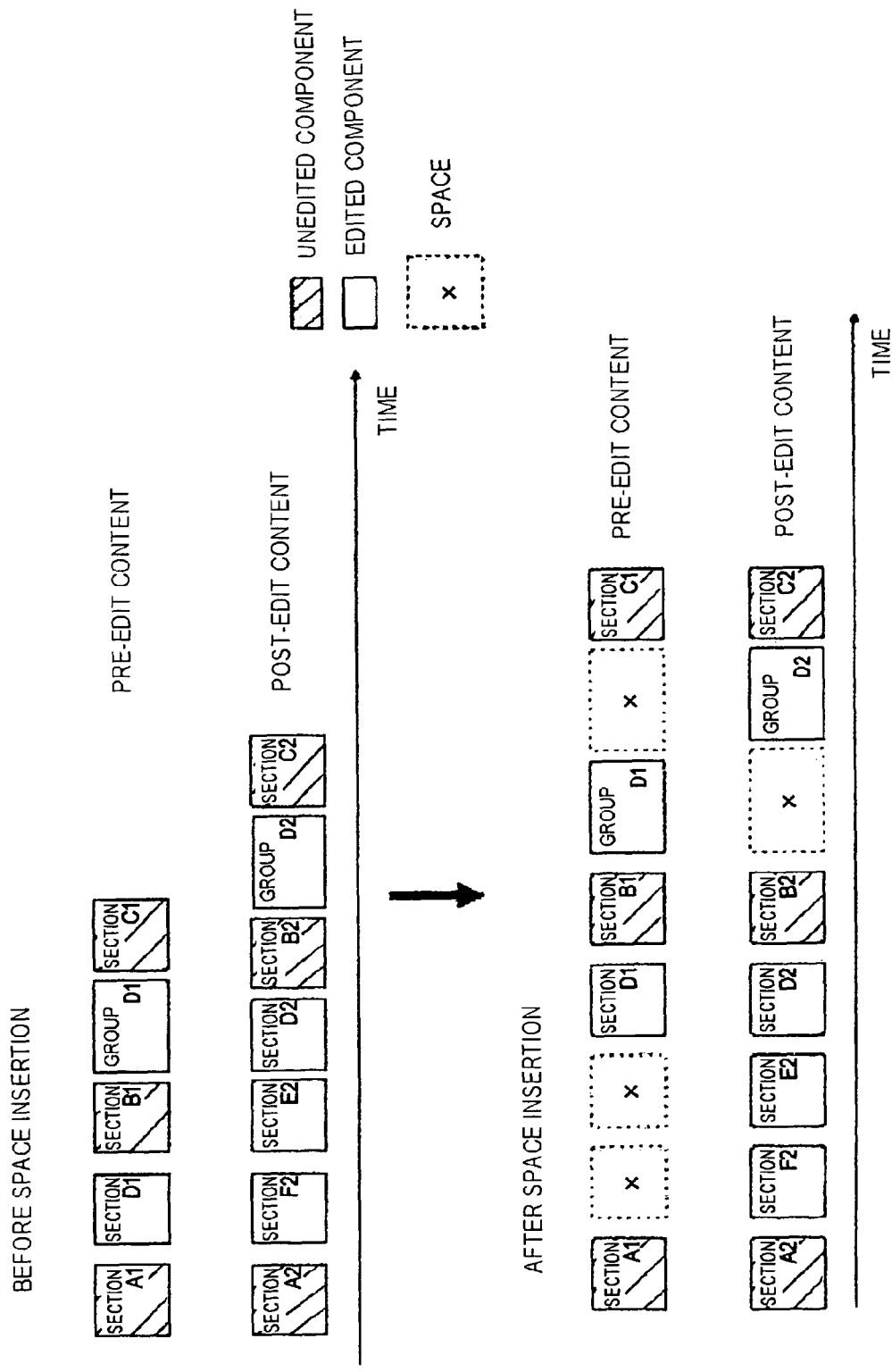
FIG. 16 is a diagram illustrating an example of screen information representing a result of setting a layout of a section component by a layout setting unit.

FIG. 16 is a diagram illustrating an example of a change in a layout of components by the layout setting unit 11.

The section component, which has not been edited, corresponding to the post-edit content is arranged in a direction vertical to a time axis. An edited section component D1 corresponds to an edited section component D2 present between unedited components A2 and B2 of the post-edit content.

Since D1 and D2 are present between section components A1 and A2, which have not been edited, arranged vertically to the time axis and B1 and B2, D1 and D2 can be arranged in a direction vertical to the time axis. The other edited section components and the edited group components do not have a corresponding component, the space and the time axis are arranged in a vertical direction.

Fourth Embodiment

Next, an edit information provision device according to a fourth embodiment of the present invention will be described with reference to the drawings.

First, a configuration and a function of the edit information provision device according to the fourth embodiment will be described.

Figure 17:
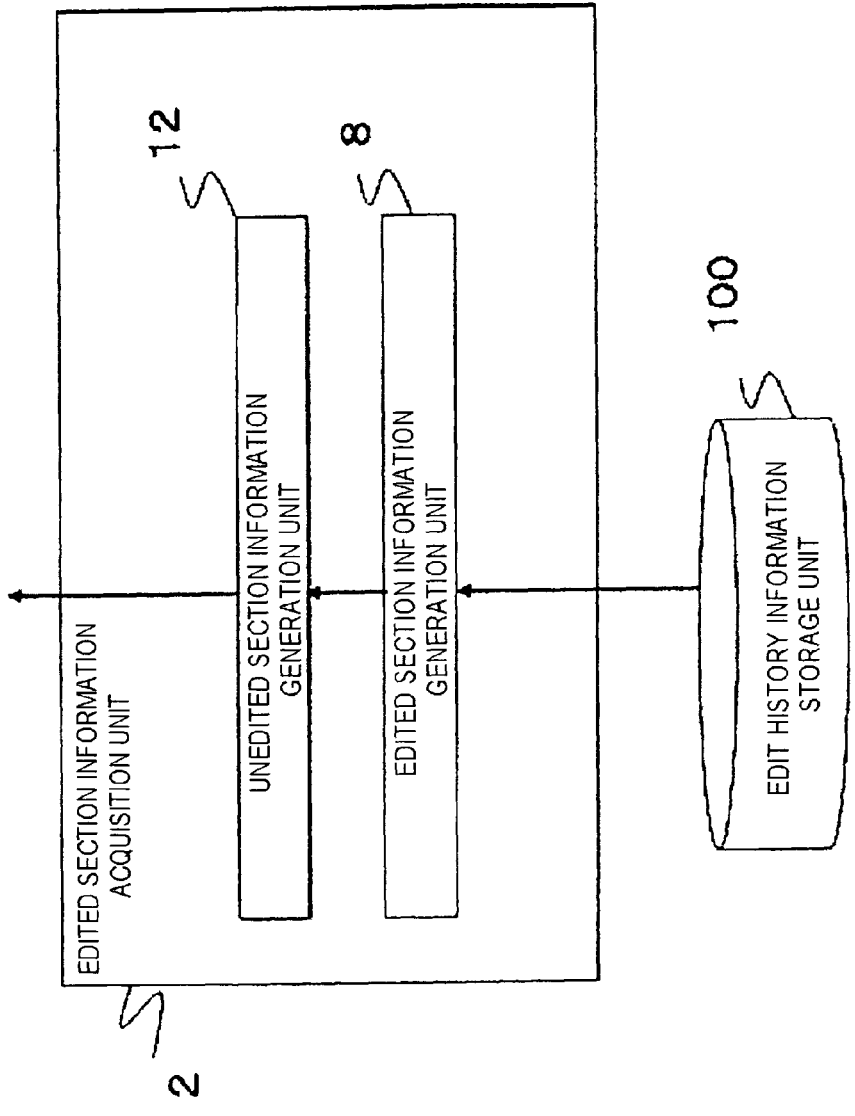
FIG. 17 is a diagram illustrating a fourth embodiment that is an embodiment in which an edited section information generation unit in the first embodiment and a new unedited section information generation unit are added to edited section information acquisition information of FIG. 1.

As illustrated in FIG. 17, the edit information provision device according to the fourth embodiment has a configuration in which an edited section information generation unit 8 having a function of extracting an edited section described in the first embodiment, and an unedited section information generation unit 12 that newly extracts a section that has not been edited are added to the edited section information acquisition unit 2 illustrated in FIG. 1.

The unedited section refers to a section, to which an editing process has not been applied, present in each of the pre-edit content and the post-edit content.

The unedited section information refers to information specifying a section to which an edit has not been added between the pre-edit content and the post-edit content. The unedited section information includes an ID identifying content in which an unedited section is present, an ID identifying an unedited section in the content, a section start/finish time, and a section length.

The edited section information is extracted from the edited section information generation unit 8, and the unedited section information is extracted from the unedited section information generation unit 12 based on the edited section information obtained from the edited section information generation unit 8.

The unedited section may be extracted by excluding edited sections from the entire content. That is, all edited sections are mapped on a time line of the entire content, and sections, in which have not been edited, being consecutive on the time axis are obtained and set as unedited sections. The unedited section information of the unedited section is extracted. Meanwhile, the edit history information may include edit history information representing that an edit has not been performed as a record of an edit operation. In this case, information to be stored in association with a section is the same as in the case in which an edit operation has been made, that is, information representing that an edit has not been performed is recorded as the edit operation content. When the edit history information representing that an edit has not been performed, that is, information explicitly describing the unedited section as being unedited is used, information of the unedited section may be used as unedited section information "as is".

The unedited section information generation unit 12 performs association between unedited sections that correspond to between before and after editing of content based on the unedited section information. As a method of generating the association information, there are two kinds of methods including a method of generating based on an order and a section length of an unedited section, and a method of generating by extracting a feature of an image/a voice of an unedited section and comparing the pre-edit content with the post-edit content. In the former, using the fact that an order and a section length of an unedited section do not vary before and after editing, and unedited sections that are equal in the section length between the pre-edit content and the post-edit content are associated in a time order. In the latter, a feature of an image/voice is extracted in before and after editing, and unedited sections that are most similar in the extracted feature of the image/voice are associated. The two unedited section association methods may be used in combination. As for the unedited sections that have been associated in the above-described manner, generated is unedited section association information in which an ID of the content in which each unedited section is present and a section ID newly assigned to an unedited section are regarded as a pair.

The edit information display screen generation unit 4 expresses a section component that has not been edited as an unedited section component in the screen information generated by the edit information provision device 1 of the first embodiment. The unedited section component is associated with the unedited section information.

Figure 18:
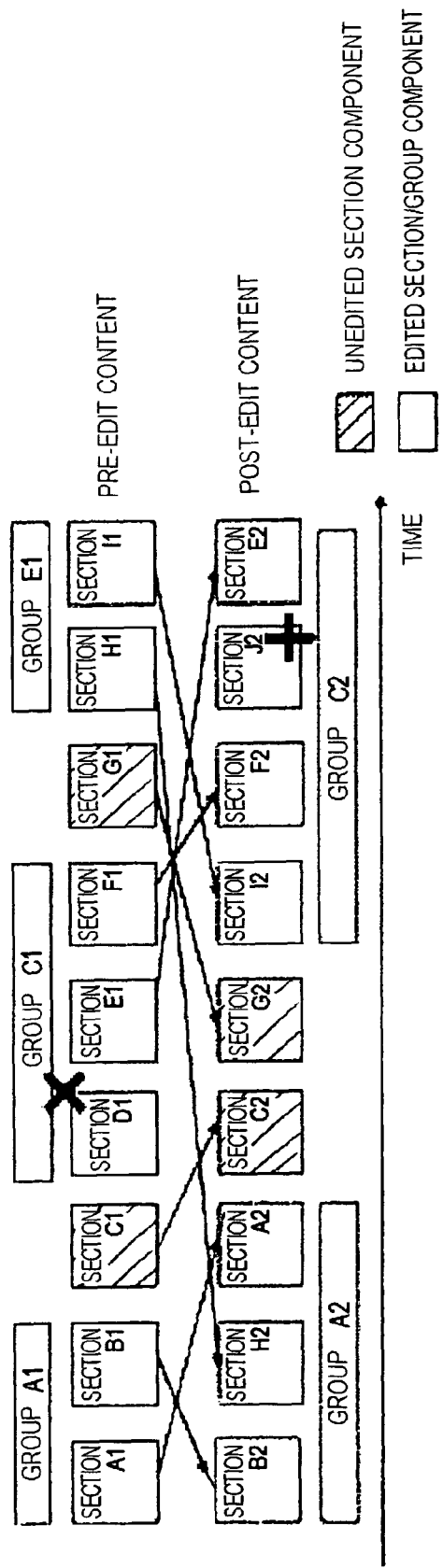
FIG. 18 is a diagram illustrating an example of screen information in which an unedited section component and unedited section association information are added to an edited section, an edited group component, and a correspondence relationship therebetween provided by a provision unit of the edit information provision device according to the first embodiment.
Figure 19:
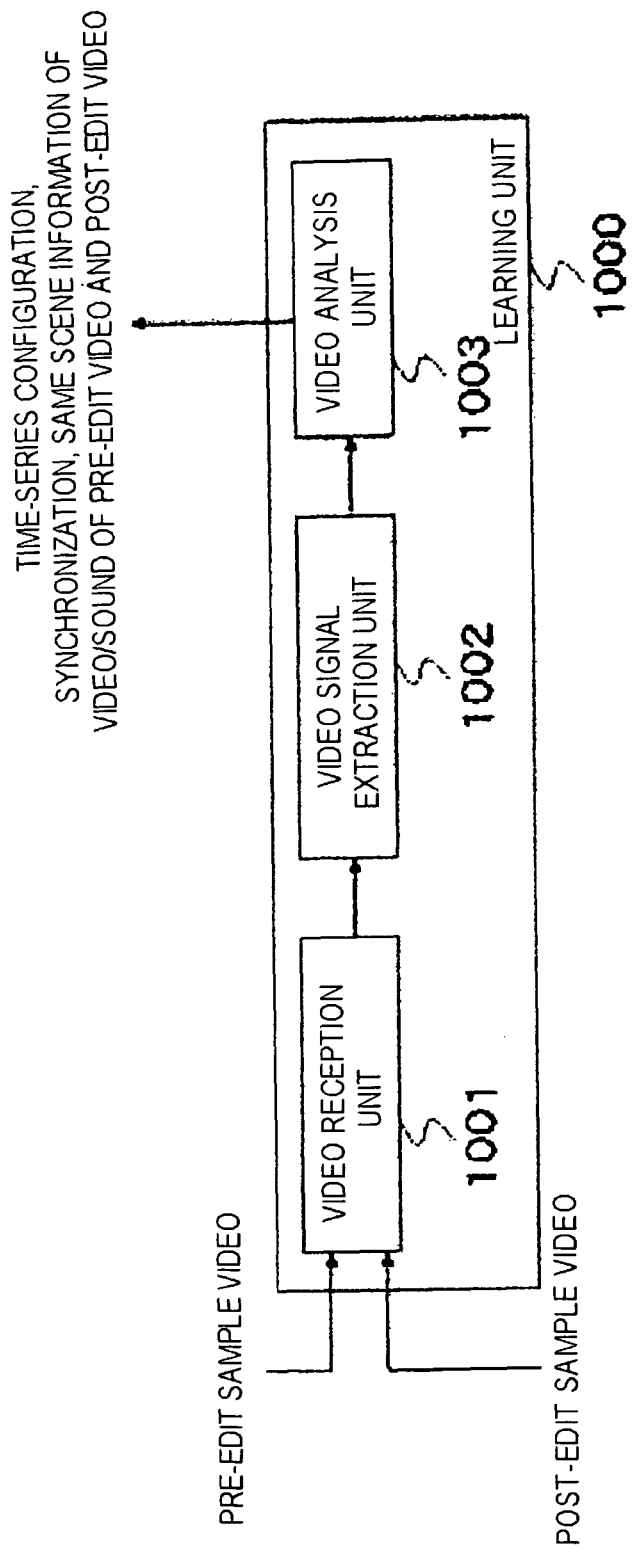
FIG. 19 is a diagram illustrating an example of the flow of extracting signal information of a shot/sound and synchronization information of a shot/sound from a pre-edit video and a post-edit video of Patent Document 1.

As illustrated in FIG. 18, generated is the screen information to which the edited section and the edited group component provided by the provision unit 6 of the edit information provision device 1 of the first embodiment, and the unedited section component and the unedited section association information that are in a correspondence relationship therewith are added. The section components are arranged in a time order based on a start time/finish time of the edited section and the unedited section.

When the unedited section component is selected by input through the input unit 5, screen information in which association between the unedited section components is emphasized can be generated.

As described above, according to the present embodiment, it is possible to display the edit content in an aggregated form and perceive an overview of the edit content by association information between groups in contents before and after editing. Thus, even though the edit history information increases, it is easy to confirm the edit content.

Further, according to the present embodiment, by extracting correspondence relationship information between a section/group of pre-edit content and a section/group of post-edit content and displaying a plurality of pieces of association information, an editorial intention can be clearly understood. For example, replacement of a section is understood from a correspondence relationship between two moved edited sections, and when one edited section is interposed between unedited sections, displacement of a section is understood.

Further, according to the present embodiment, since the edit information can be partially aggregated or developed, the edit information of the content can be easily confirmed. That is, when a part of the edit history information is aggregated, a sufficient space is given for the display of other edit history information, and because of the space, the edit history information can be displayed in detail with a large size. Thus, the user can easily confirm the edit information. Further, the edit information to which the user does not pay attention can be collected in a reduced space.

Further, according to the present embodiment, since an unedited section, and a relative order and a section length of unedited sections do not vary between the pre-edit content and the post-edit content, a change in the content before and after editing can be organized and used as a framework for aggregation.

Further, according to the present embodiment, the content includes two sections including the edited section and the unedited section. Thus, by collecting the edited sections being consecutive in a time order and making association between the pre-edit content and the post-edit content, it is possible to take a form in which the edit information is organized by the unedited section.

Further, according to the present embodiment, since there is provided a correspondence relationship between the edited sections, between the edited section and the edited group, or between the edited groups, not only an edit method of a section that attracts attention but also association with an edited section, an edited group, or other sections that attracts attention becomes clear, therefore, an editorial intention can be read.

Further, according to the present embodiment, by extracting a correspondence relationship between the edited sections, between the edited section and the edited group, or between the edited groups, the association information can be displayed in an aggregated form, therefore, the association information can be easily confirmed.

Further, according to the present embodiment, by changing a method of displaying the association information according to input, information of a part to which the user pays attention is provided in detail, and information of a part to which the user does not pay attention is displayed in a reduced space. Thus, it is easy to display information of a part to which the user pays attention in a sufficient space.

The present invention is configured as described above but not limited to the above embodiments. Various modifications can be made within the scope of the gist of the present invention.

The present application claims a priority based on Japanese Priority Patent Application JP 2008-329699 filed with the Japan Patent Office on Dec. 25, 2008, the entire content of which is hereby incorporated by reference.

DESCRIPTION OF LETTERS OR NUMERALS

1 Edit information provision device
2 Edited section information acquisition unit
3 Pre-edit content/post-edit content correspondence relationship acquisition unit
4 Edit information display screen generation unit
5 Input unit
6 Provision unit
7 Edit history importance judgment unit
8 Edited section information generation unit
9 Component generation/association unit
10 Component/component association selection unit
11 Layout setting unit
12 Unedited section information generation unit
100 Edit history information storage unit

The invention claimed is:

1. A computer-implemented edit information provision device that provides a correspondence relationship between before and after editing in an editing process that performs correction on content including a time axis for each section, said edit information provision device comprising:

a non-transitory computer readable storage medium, an edited section information acquisition unit that, by a processing unit of a computer, generates edited section association information that associates a section in a part of a content before performing corrections, which section is to be corrected and is interposed in time series between sections not to be corrected, with a section in a part of a content after performing corrections, which section has been corrected and is interposed in time series between uncorrected sections;

a provision unit that provides an association between the section in the part of the content before performing corrections and the section in the part of the content after performing corrections, which association is described by the edited section association information, wherein the edited section information acquisition unit acquires edit history information, which includes time information of a section to which the editing process has been applied, and generates the edited section association information using the acquired edit history information;

a before-correction group generation unit that generates a before-correction group using the edit history information, which group includes a group of sections to be corrected and being consecutive along the time axis; and a first section/group association information generation unit that determines the section having been corrected that is associated with sections of the before-correction group using the edited section association information, and generates a first section/group association information that associates the before-correction group and the section determined by the first section/group association information generation unit, wherein the provision unit further provides the association between the before-correction group and the section having been corrected, which association is described by the first section/group association information.

2. The edit information provision device as claimed in claim 1, further comprising:

an after-correction group generation unit that generates an after-correction group using the edit history information, which group is a group of the sections having been corrected and being consecutive along the time axis; and a second section/group association information generation unit that determines the section to be corrected that is associated with sections of the after-correction group using the edited section association information, and generates a second section/group association information that associates the after-correction group and the section determined by the second section/group association information generation unit, wherein the provision unit further provides the association between the after-correction group and the section to be corrected, which association is described by second section/group association information.

3. The edit information provision device as claimed in claim 2, further comprising an inter-group association information generation unit that generates inter-group association information associating the before-correction group and the after-correction group so that at least one of the sections of the before-correction group is associated with the section of the after-correction group in the edited section association information, wherein said provision unit further provides the association between the before-correction group and the after-correction group, which association is described by the inter-group association information.

4. The edit information provision device as claimed in claim 3, further comprising:

an input unit that receives from a user an input indicating which to use out of the first section/group association information, the second section/group association information, and the inter-group association information, wherein said provision unit provides the association described by at least one of the first section/group association information, the second section/group association information, and the inter-group association information indicated by the input that the input unit receives.

5. The edit information provision device as claimed in claim 3, wherein said edited section information acquisition unit calculates an importance of the edit history information based on a length of the section and a content of an editing process of the section, which are indicated by the edit history information, when providing said correspondence relationship between said content before performing corrections and said content after performing corrections, and generates subsection information that indicates the section as a subsection when the calculated importance of the edit history information indicating the section is lower than a predetermined threshold value, and wherein the provision unit does not provide the subsection when providing the content before performing corrections and the content after performing corrections.

6. The edit information provision device as claimed in claim 3, wherein the provision unit provides with said correspondence relationship between said content before performing corrections and said content after performing corrections in a manner of arranging positions of sections/groups that correspond to each other in a direction that vertically intersects with a reproduction order by arranging sections/groups that are in a correspondence relationship between said content before performing corrections and said content after performing corrections in said reproduction order, and then inserting a space between a section and a group in at least one of said content before performing corrections and said content after performing corrections.

7. The edit information provision device as claimed in claim 1, wherein said edited section information acquisition unit extracts a section on which said correction is not to be performed as an unedited section, extracts a correspondence relationship between said unedited sections, and allows said provision unit to provide said correspondence relationship between said content before performing corrections and said content after performing corrections in a section interposed between said unedited sections.

8. The edit information provision device as claimed in claim 7, wherein said edited section information acquisition unit extracts said unedited section between said content before performing corrections and said content after performing corrections by taking a difference of edited section association information between said content before performing corrections and said content after performing corrections.

9. The edit information provision device as claimed in claim 7, wherein said edited section information acquisition unit extracts said unedited section between said content before performing corrections and said content after performing corrections by using said information related to said unedited section when information related to an unedited section that is a section that has not been edited is included in edit history information generated when said content after performing corrections is generated from said content before performing corrections.

10. The edit information provision device as claimed in claim 7, wherein said edited section information acquisition unit extracts association information of unedited sections between said content before performing corrections and said content after performing corrections by associating unedited sections having a same section length between said content before performing corrections and said content after performing corrections in an order in which said unedited sections present in said content before performing corrections and said content after performing corrections are arranged.

11. The edit information provision device as claimed in claim 7, wherein said edited section information acquisition unit calculates association information of unedited sections between said content before performing corrections and said content after performing corrections by checking said unedited sections by a video or an acoustic feature quantity between said content before performing corrections and said content after performing corrections and associating same unedited sections.

12. A non-transitory computer readable storage medium storing a program causing a computer to function as the edit information provision device as claimed in claim 1.

13. The edit information provision device as claimed in claim 1, wherein the section in the part of content before performing corrections, which sections are to be corrected, are consecutively interposed in the time series between the sections not to be corrected.

14. The edit information provision device as claimed in claim 1, further comprising:
a content before performing corrections/content after performing corrections correspondence relationship acquisition unit that calculates a section on which correction has been performed as an edited section for each of said content before performing corrections and said content after performing corrections, and in time series groups consecutive edited sections to generate an edited group for each of said content before performing corrections and said content after performing corrections.

15. The edit information provision device as claimed in claim 14, wherein said provision unit provides a correspondence relationship between said content before performing corrections and said content after performing corrections by a correspondence relationship between edited groups of said edited group.

16. The edit information provision device as claimed in claim 1, further comprising:
a content correspondence relationship acquisition unit that generates an inter-group association information by associating edited groups of said content before performing corrections and said content after performing corrections, and generates section/group association information by associating an edited section, which includes a section on which correction has been performed for each of said content before performing corrections and said content after performing corrections, with an edited group for each of said content before performing corrections and said content after performing corrections,
wherein, in said edited groups, sections that are consecutive in a time order inside each of said content before performing corrections and said content after performing corrections are collected into one group.

17. The edit information provision device as claimed in claim 16, wherein said provision unit provides a correspondence relationship between said content before performing corrections and said content after performing corrections by one of a correspondence relationship between groups temporally consecutive edited sections, a correspondence relationship between said edited section and said edited group, and a correspondence relationship between said edited groups by using at least one of said inter-edited group association information and said section/group association information.

18. An edit information provision method, which is executed by a computer in an edit information provision device that provides a correspondence relationship between before and after editing in a content for an editing process of performing correction on a content having a time axis for each section, said method comprising:
generating edited section association information that associates a section in a part of a content before performing corrections, which section is to be corrected and is interposed in time series between sections not to be corrected, with a section in a part of a content after performing corrections, which section have been corrected and is interposed in time series between uncorrected sections;
providing an association between the section in the part of the content before performing corrections and the section in the part of the content after performing corrections, which association is described by the edited section association information,
wherein said generating edited section association information comprises acquiring edit history information, which includes time information of a section to which the editing process has been applied, and generating the edited section association information using the acquired edit history information,
generating a before-correction group using the edit history information, which group includes a group of sections to be corrected and being consecutive along the time axis; and
determining the section having been corrected that is associated with sections of the before-correction group using the edited section association information, and generating a first section/group association information that associates the before-correction group and the section determined by said determining the section having been corrected,
wherein said providing said association further comprises providing the association between the before-correction group and the section having been corrected, which association is described by the first section/group association information.

* * * * *